United States Patent Office 2,896,601
Patented July 28, 1959

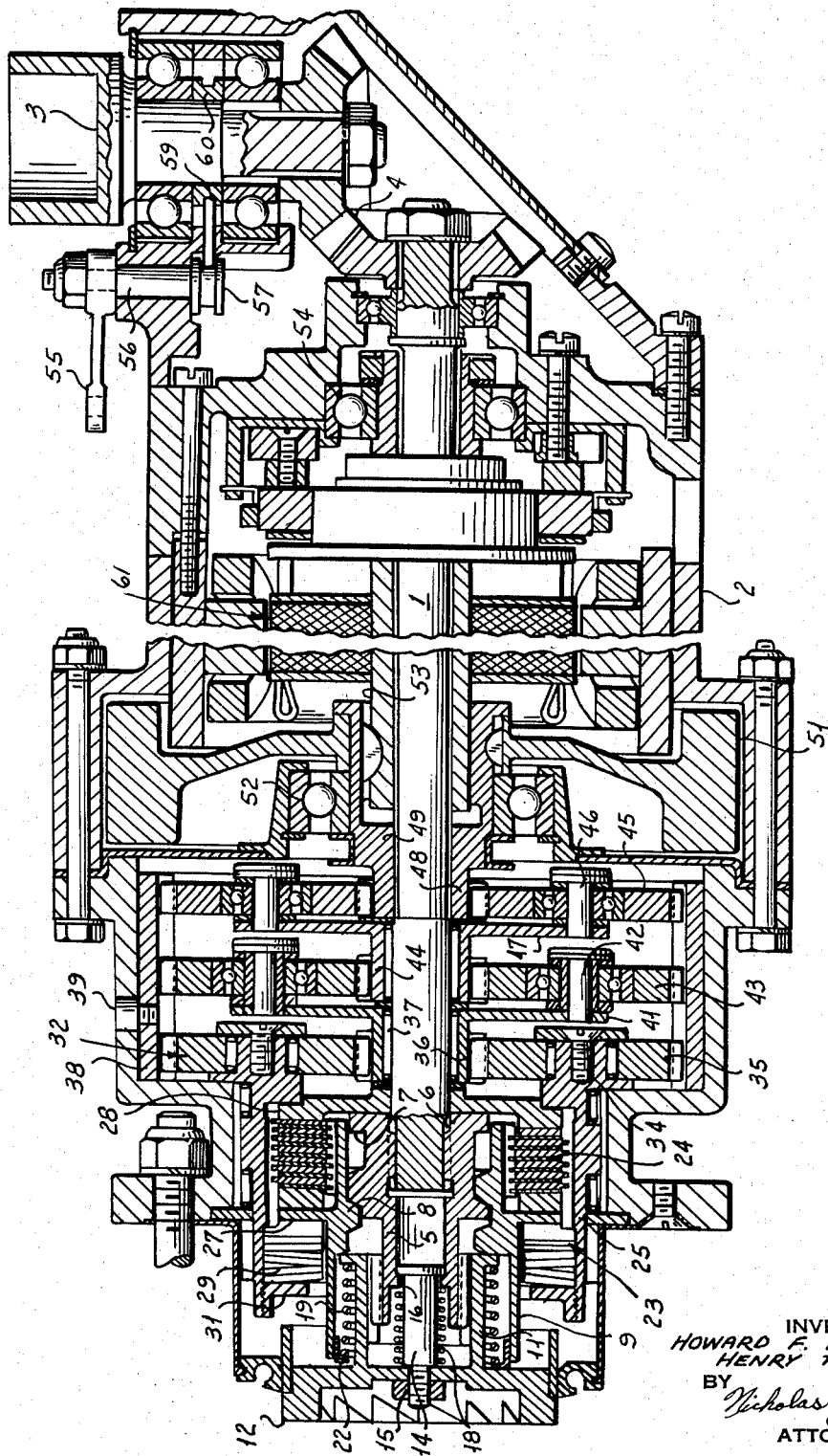

2,896,601

ENGINE STARTER DUO TORQUE CLUTCH MECHANISM

Henry Troeger, Ramsey, and Howard F. Hoefener, Riverdale, N.J., assignors to Bendix Aviation Corporation, Teterboro, N.J., a corporation of Delaware Application February 25, 1955, Serial No. 490,512

3 Claims. (Cl. 123—179)

This invention pertains to clutch mechanisms. It particularly concerns a clutch arrangement which will transmit a large torque when driven from one end, but will transmit a lesser torque when driven in the same direction from the other end.

A clutch of this sort is desirable in applications where a motivating unit is to deliver a high torque, but must be protected from such high torques driving it. It is particularly suited to use in combination with an inertia type engine starter which must deliver high torques, but is cranked to speed through a small shaft which will not stand such torques and must be protected.

An object of the invention is, therefore, a clutch arrangement which will transmit a large torque when driven from one end, and will transmit a lesser torque when driven in the same direction from the other end.

Another object of the invention is the combination of such a clutch in an engine starter mechanism.

A further object of the invention is the combination of such a clutch in an engine starter mechanism which may be motor driven or cranked by hand to speed, as desired.

The foregoing and other objects and advantages of the invention will appear more fully hereinafter from a consideration of the detailed description which follows, taken together with the accompanying drawings wherein an embodiment of the invention is illustrated. It is to be expressly understood, however, that the drawing is for purposes of illustration and description, and is not to be construed as defining the limits of the invention.

The drawing is a longitudinal section through an engine starter mechanism embodying the invention.

Referring to the drawing, there is disclosed a combined motor and hand operable engine starter mechanism having a main shaft 1 suitably supported for rotation in a proper housing 2. Manual power applied to a crank shaft 3 is transmitted to the main shaft through bevel gearing 4. A hollow screw member 5 is splined in an end 6 thereof for slidable axial movement on the free end of the main shaft. The screw portion of member 5 is provided with external helical splines 7, which are engaged with complementary internal splines 8 of a sleeve member 9. Splined for axial movement on an extended left end of screw member 5 is a stub shaft 11 of a starter jaw head 12. The starter member is prevented from sliding free of the screw member by a plunger rod 14 axially bolted at an end 15 to the starter head. Plunger 14 is slidable in the left end of the screw member 5 and it is restrained in the extent to which it may slide out of the latter by a headed end that is limitable against a stop 16 internally of the screw member. A coil spring 18 between the starter head and stop 16 urges the starter head in an outward direction.

Surrounding starter shaft 11 is a starter restoring coil spring 19 which is confined between a peripheral end flange of shaft 11 and a depending ring 22 fitted in the left end of an extended portion of sleeve member 9.

Sleeve member 9 is part of a multiple disc pack clutch structure 23 which includes a plurality of disc leaves carried internally of a barrel member 25 and interleaved with disc leaves carried on the external surface of sleeve member 9 to form a disc clutch pack 24. The clutch pack is limited between a flange 27 about the sleeve member and a backing plate 28 carried by main shaft 1. A plurality of compression springs 29 of the washer type, carried on the sleeve member and packed between flange 27 and a flanged nut 31 threaded in the free open end of the barrel member, act through sleeve member 9 to maintain the disc members in frictional engagement with one another under a pressure sufficient to insure transmission of torque from either direction up to a predetermined capacity. The spring pressure is adjustable by threading the nut member 31 further in or out of the clutch barrel.

A characteristic of the clutch arrangement is that it will allow only a small torque to pass from the drive shaft and screw 5 through the clutch to the barrel without slipping; and will allow a relatively larger torque to pass from the barrel to the screw member. Because of this characteristic, the clutch is particularly suited to devices wherein a high degree of torque, if passed from the drive shaft to the clutch, is apt to snap the drive shaft or do other damage to the starter device in which it is embodied.

The starter device is designed for application of either manual or motor power in starting the associated engine, not shown. In the operation of the device by hand, manual power is applied to the crank shaft 3 and is transmitted through the main drive shaft 1 and screw member 5 to the clutch pack. The transmitted power is multiplied by mechanism, generally indicated at 32, and subsequently to be described. This multiplied power is returned through the clutch to the screw 5, and is then transmitted to the starting jaws. Now, in a sudden and excessive application of manual power to the drive shaft, the latter, because of its slender structure, is apt to snap, or other damage to the screw and other elements is likely to occur. Damaging effects of this nature are, however, prevented by the clutch structure, which will slip under the application of any excessive torque. In the transmission of manual power applied to the main shaft, such is transmitted to the screw member 5. The latter because of its thread arrangement with the sleeve member tends to move to the right, but cannot do so because of the blocking clutch plate 28. Whereupon, the screw member exerts a force upon the sleeve member 9, forcing the flange of the latter to act leftward upon the spring elements 29, thereby diminishing the spring pressure upon the disc pack. By this arrangement, it can be seen that a degree of torque above a certain minimum applied in this direction to the clutch will slip the latter. The low torque transmitted would, however, be inadequate for starting the associated engine load and must therefore be multiplied. To this end, the mechanism at 32 is employed.

The power or torque multiplying mechanism comprises planetary gearing and a fly wheel associated with the clutch barrel. Carried on trunnions 34, mounted in the right end of the clutch barrel, are planetary gears 35 which are meshed with a sun gear 36 rotatably supported on needle bearings 37 carried by the drive shaft. The planetary gears also engage a surrounding internally toothed barrel gear 38 that is held by fasteners 39 in a stationary position. A plate 41 radiating from the hub of sun gear 36 carries trunnions 42 on which are mounted a second set of planetary gears 43 which mesh with a second sun gear 44 and also with the barrel gear 38. A third set of planetary gears 45, mounted on trunnions 46 of a plate 47 associated with the second sun gear, is also in mesh with the barrel gear and with a third sun gear 48. The latter sun gear is formed on the hub 49 of a fly wheel member 51. The hub 49 rotates in a proper bearing 52 and sleeves the main drive shaft at the left end. The opposite end of the hub is of enlarged diameter and is keyed fast on an end of an armature shaft 53 that sleeves the main shaft. The armature shaft is supported at its right end in a housing bearing 54. By this arrangement it is clear, that a low torque transmitted from shaft 1 to the clutch barrel 25 will be conveyed to the planetary gearing and fly wheel. The latter elements serve to multiply the torque. This multiplied torque in the clutch barrel is returned through the sleeve member to the screw element, and as it does so it tends to force the sleeve member 9 to the right, thereby increasing the pressure of flange 27 upon the disc pack, and consequently raising the degree of torque that would have to be transmitted through the screw 5 to slip the clutch.

The torque built up in the barrel by the planetary gearing is transmitted to the screw member and drive shaft, whereupon these elements rotate together at the same speed. Suitable means is provided to cause the starter jaw member to move out axially into mesh with the opposing associated engine jaw. This is accomplished by retarding the speed of the drive shaft relative to that of the clutch barrel. To this end, braking means is provided. This includes a manually operable lever 55 fast upon a turn shaft 56. The latter has an eccentric 57 mounted on an end thereof that is operable against a yoke shoe member 59 to cam forked arms 60 of the latter to effect a braking action on the crank shaft 3. Retarding of the main shaft as a result of the latter action, causes the screw member 5 to move axially out along the end of the drive shaft, sufficiently to slide the starter jaw into engagement with the associated engine jaw, not shown.

Motor power may be applied in lieu of manual power directly to drive the clutch barrel and screw member. To this end, there is carried by the armature shaft 53 the armature of a motor, generally indicated at 61. It is clear, that energization of the motor will drive the armature shaft and, in the manner previously described, will transmit the motor power through the fly wheel and planetary gearing elements and clutch to the screw member 5.

Although an embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art.

What is claimed is:

1. The combination in a duo degree torque transmitting clutch including a disc pack and a pressure plate normally exerting pressure upon the disc pack to hold the discs thereof in frictional engagement with one another for transmission of torque therethrough, means for transmitting torque through the pack from a particular direction and means for reducing the extent of the pressure of the pressure plate upon the pack in direct proportion to the degree of this torque transmitted, means for transmitting torque through the disc pack from the opposite direction and means for increasing the pressure of the pressure plate upon the pack when torque is transmitted from this latter direction.

2. In combination with torque multiplying means, a disc pack clutch member comprising a clutch barrel operatively connected to the torque multiplying means, a clutch sleeve within the barrel having a disc pack interleaved with a complementary disc pack of the barrel member, a clutch plate backing one end of the disc pack, a flange plate about the sleeve fronting the opposite end of the disc pack, an adjustable nut threaded in the open end of the barrel, spring elements between the nut and the flange plate normally transmitting pressure through the latter to frictionally engage the interleaved disc packs with one another for transmission of torque from the clutch sleeve to the barrel and from the barrel to the clutch sleeve, and screw means threaded in the sleeve for transmitting torque through the sleeve to the barrel and to the associated torque multiplying means, the torque transmitted by the screw member tending to force the sleeve in a direction to reduce its pressure upon the disc pack, the multiplying means serving to multiply the received torque and to return it through the barrel and sleeve to the screw means, and the multiplied torque serving to urge the sleeve in a direction to increase its pressure upon the disc pack.

3. In engine starting mechanism of the type employing torque multiplying means in which a low torque may be further developed for transmission to a member of the engine to be started to cause initial rotation thereof, a manually operable crank shaft, slip clutch means for transmitting a torque from the crank shaft to the torque multiplying means, means for slipping the clutch upon the torque transmitted from the crank shaft exceeding a rated value, means for returning the multiplied torque through the slip clutch means to the crank shaft, and means for transmitting the multiplied torque from the crank shaft to the member of the engine to be started.

References Cited in the file of this patent

UNITED STATES PATENTS

| | | |
|---|---|---|
| 1,427,025 | Schlafly | Aug. 22, 1922 |
| 1,442,417 | Truebe | Jan. 16, 1923 |
| 1,491,804 | Kiefere | Apr. 29, 1924 |
| 2,163,829 | Chilton | June 27, 1939 |
| 2,695,693 | Cartlidge | Nov. 30, 1954 |

FOREIGN PATENTS

| | | |
|---|---|---|
| 741,013 | Germany | Nov. 3, 1943 |
| 1,083,931 | France | Jan. 13, 1955 |